March 22, 1927.
R. A. MAYER
AUTOMOBILE ACCESSORY
Filed Sept. 2, 1926
1,621,849
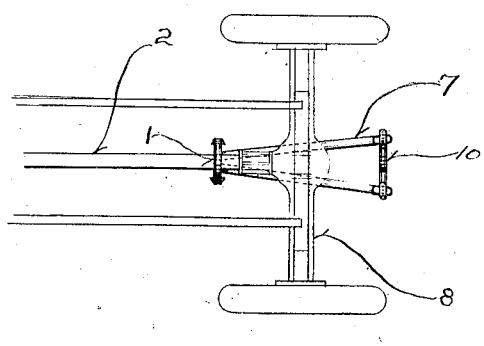
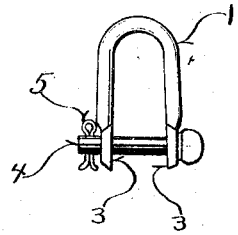
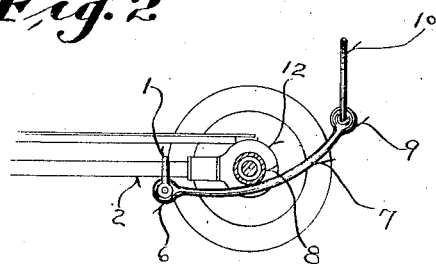
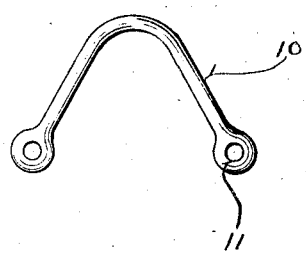
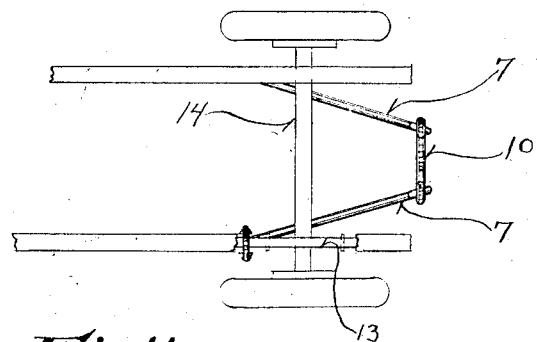
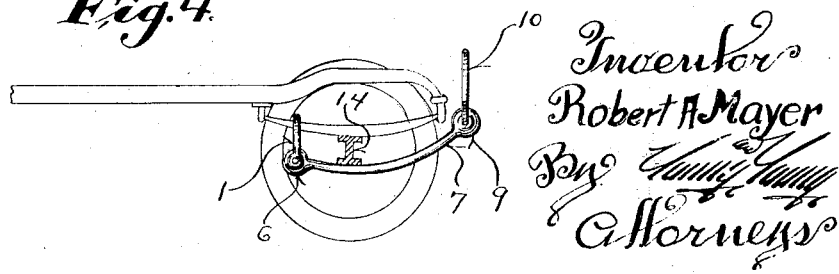
Inventor
Robert A. Mayer
By
Attorneys Patented Mar. 22, 1927.

1,621,849

UNITED STATES PATENT OFFICE.

ROBERT A. MAYER, OF HALES CORNERS, WISCONSIN.

AUTOMOBILE ACCESSORY.

Application filed September 2, 1926. Serial No. 133,206.

This invention relates to automobile accessories, and is particularly directed to a device used in connection with the towing of automobiles.

In towing automobiles, particularly when one or the other end of the automobile has been disabled, it is frequently found difficult to suitably attach the hooks or chains of the hoist so that the machine may be towed in a convenient manner, and also without damaging the automobile. Frequently, the automobile is damaged by the chains or hooks and has to be refinished or otherwise treated.

This invention is designed to overcome the defects noted above and objects of such invention are to provide a novel form of apparatus which may be secured to an automobile in a very simple manner, and which may be attached to the hook of the hoist without any possibility of damage to the automobile.

Further objects are to provide a device for use in towing, which can be attached to any make of automobile either at the front or rear with the assurance that undue stresses will not be imposed on any portion of the automobile, and also in such a manner that the hoisting apparatus can not damage the towed automobile.

Embodiments of the invention are shown in the accompanying drawings in which:—

Figure 1 is a plan view of the device showing it attached at the rear of one make of automobile;

Figure 2 is a vertical sectional view through the rear of the automobile illustrated in Figure 1, such view corresponding to a section on the line 2—2 of Figure 1;

Figure 3 is a view showing the device applied to a different type of automobile and attached in a different manner;

Figure 4 is a side elevation partly in section of the structure shown in Figure 3;

Figure 5 is an enlarged view of the attaching clevis;

Figure 6 is an enlarged view of the hook receiving loop.

Referring to the drawings, particularly Figures 1, 2, 5, and 6, it will be seen that the device comprises a U-shaped clevis or attaching member 1 which is placed over the propeller shaft housing 2. This U-shaped member is provided with a pair of apertured ears 3 at its lower end through which a pin 4 is inserted. This pin may be either screwed in place or secured by a cotter or split pin 5. The pin 4 is readily slipped into place and is passed through the eyeleted ends 6 of a pair of curved supporting arms or rods 7. These rods pass under the rear axle housing 8 of the automobile, as shown in Figures 1 and 2, and when they are lifted upwardly at their outer ends they lift the rear of the automobile clear of the ground. The outer ends are eyeleted, as indicated at 9 in Figure 2, and a U-shaped hook receiving member 10 is similarly provided with eyeleted ends 11 which interengage the eyeleted ends 9.

In using the device for raising this type of automobile the clip or clevis 1 is slipped over the propeller shaft housing 2 closely adjacent the universal housing 12, and the members 7 are positioned beneath the rear axle housing 8. Thereafter, the U-shaped member 10 is engaged by the hook of the hoist and the rear of the car is readily lifted from the ground. It will be seen that the U-shaped member can be easily engaged by the hook of the hoist without any possibility of damage to the car.

In using this device at the front end of cars, two clevises 1 may be used and they may be hooked over the rear end of the front springs 13, as shown in Figures 3 and 4. The bars 7 are passed beneath the front axle 14, and the U-shaped member 10 is then in position to be engaged by the hook of the hoist without any possibility of damage to the automobile.

It is obvious that the device could be attached to other portions of the automobile, if desired, provided the rods or bars 7 were passed beneath the front or rear axle of the machine. For example, the clevis could be positioned over the radius rods of a certain make of car at the front thereof with the bars positioned beneath the front axle.

At all events the rods pass under either the front or the rear axle of the automobile and the clevis, whether used singly or doubly, is secured to a suitable point on the automobile, so that the weight of the automobile may be carried by pressure exerted against the front or rear axle it being understood that the term "axle" is intended to cover the rear axle housing as well as the front axle.

It will be seen further that the device is of very simple construction and may be easily produced of sufficient strength to withstand any stresses imposed thereon.

It will be seen further that the device can be instantly attached to a disabled car, so that the car may have its end lifted clear of the ground and may, in this condition, be readily towed to the garage.

If desired, it may be found expedient to pass the chain around the clevis and through the spring hanger when the device is used as indicated in Figure 4. This usually will not be found necessary from actual tests conducted with the apparatus, but it may be very readily followed in a simple and easy manner, if desired.

Although the invention has been described in considerable detail, such description is intended as illustrative rather than limiting as the invention may be variously embodied and as the scope of such invention is to be determined as claimed.

I claim:

1. A device for use in towing automobiles comprising a pair of rods adapted to be placed beneath the axle of an automobile, said rods having inner eyeleted ends provided with means for engaging over a portion of the automobile and having upwardly extending outer eyeleted ends, a U-shaped member adapted to receive the hook of a hoist and joining the outer eyeleted ends of said rods, said rods being arched downwardly between the inner and outer ends.

2. A device for towing automobiles comprising a pair of downwardly arched rods adapted for positioning beneath the axle of an automobile, said rods having eyeleted outer ends, a clevis consisting of a U-shaped member provided with a pin adapted to be passed through inner eyeleted ends of said rods, and a U-shaped member adapted to receive the hook of a hoist and joining the outer eyeleted ends of said rods.

3. A device for use in towing automobiles comprising a pair of rods adapted to be placed beneath the axle of an automobile, said rods having eyeleted ends provided with means for engaging over a portion of the automobile and having outer eyeleted ends, a U-shaped member adapted to receive the hook of a hoist and joining the outer eyeleted ends of the rods.

In testimony that I claim the foregoing I have hereunto set my hand at Hales Corners, in the county of Milwaukee and State of Wisconsin.

ROBERT A. MAYER.